(12) United States Patent
Dicicco et al.

(10) Patent No.: US 12,005,403 B2
(45) Date of Patent: Jun. 11, 2024

(54) MIXING CHAMBER APPARATUS FOR HIGH-VOLUME SAMPLING

(71) Applicants: Signature Science, LLC, Charlottesville, VA (US); Government of The United States of America, as represented by the Secretary of Homeland Security, Washington, DC (US)

(72) Inventors: Joseph A. Dicicco, Cape May Court House, NJ (US); Paul M. Flanigan, IV, Marlton, NJ (US); David Perry, Austin, TX (US); John Brady, Medford, NJ (US); Barry Smith, Egg Harbor City, NJ (US)

(73) Assignees: Signature Science, LLC, Charlottesville, VA (US); Government of The United States of America, as represented by the Secretary of Homeland Security, Washington, DC (US)

(*) Notice: Subject to any disclaimer, the term of this patent is extended or adjusted under 35 U.S.C. 154(b) by 432 days.

(21) Appl. No.: 17/395,191

(22) Filed: Aug. 5, 2021

(65) Prior Publication Data
US 2022/0040648 A1 Feb. 10, 2022

Related U.S. Application Data

(60) Provisional application No. 63/062,071, filed on Aug. 6, 2020.

(51) Int. Cl.
*B01F 23/10* (2022.01)
*B01F 25/421* (2022.01)
(Continued)

(52) U.S. Cl.
CPC .......... *B01F 23/19* (2022.01); *B01F 25/4231* (2022.01); *B01F 35/513* (2022.01);
(Continued)

(58) Field of Classification Search
CPC ...... B01F 23/19; B01F 23/10; B01F 25/4231; B01F 35/513; B01F 2035/3511;
(Continued)

(56) References Cited

U.S. PATENT DOCUMENTS 1,165,736 A * 12/1915 White .................... B61D 5/002
222/413
3,656,657 A * 4/1972 Smith ....................... F17C 7/00
222/464.2
(Continued)

*Primary Examiner* — Patrick C Williams
(74) *Attorney, Agent, or Firm* — Ballard Spahr LLP

(57) ABSTRACT

Disclosed is a mixing chamber apparatus suitable for high-volume sampling (HVS) application. The mixing chamber apparatus includes, among other elements, inlet and outlet manifolds, a mixing chamber, and a tubing manifold for the introduction of clean, turbulent air into the mixing chamber. The inlet manifold defines a plurality of vapor ports that can be in fluid communication with one or more vapor sources to be sampled and mixed within the mixing chamber. Also described herein is a baffled mixing system that can be used alone or in combination with the disclosed mixing chamber apparatus.

21 Claims, 15 Drawing Sheets

(51) Int. Cl.
  *B01F 35/30*      (2022.01)
  *B01F 35/513*     (2022.01)
  *B01F 101/23*     (2022.01)
  *G01N 1/22*       (2006.01)

(52) U.S. Cl.
  CPC ........ *G01N 1/22* (2013.01); *B01F 2035/3511* (2022.01); *B01F 2101/23* (2022.01)

(58) Field of Classification Search
  CPC .......... B01F 2101/23; G01N 2001/387; G01N 2001/022; G01N 1/22; G01N 1/2273; G01N 1/38
  See application file for complete search history.

(56)            References Cited

U.S. PATENT DOCUMENTS

| | | | | |
|---|---|---|---|---|
| 5,232,246 | A * | 8/1993 | Page | B60P 3/22 |
| | | | | 280/475 |
| 5,251,473 | A * | 10/1993 | Reese | F17C 13/126 |
| | | | | 137/574 |
| 9,283,883 | B2 * | 3/2016 | Vaughn | B65D 90/08 |
| 2005/0073908 | A1 * | 4/2005 | Bibbo | B01F 23/53 |
| | | | | 366/314 |
| 2010/0015696 | A1 * | 1/2010 | Claes | B01F 33/813 |
| | | | | 435/303.3 |
| 2013/0150268 | A1 * | 6/2013 | Oldham | C09K 8/62 |
| | | | | 422/162 |
| 2017/0349874 | A1 * | 12/2017 | Jaques | B01F 27/191 |
| 2019/0218496 | A1 * | 7/2019 | Brau | B01F 27/054 |

* cited by examiner

MIXING CHAMBER APPARATUS FOR HIGH-VOLUME SAMPLING

CROSS-REFERENCE TO RELATED APPLICATION

This application claims priority to and the benefit of the filing date of U.S. Provisional Patent Application No. 63/062,071, filed Aug. 6, 2020, which is incorporated herein by reference in its entirety.

FIELD

This application relates generally to a mixing chamber apparatus useful for high-volume sampling (HVS) and methods of using the chamber apparatus.

BACKGROUND

Sampling and detection methodologies are currently being developed by a variety of researchers to detect contraband material. The detection of contraband material is challenging because of the possible number of signature molecules, their wide range of chemical structures, and their vast range of vapor pressures. Storing contraband materials in enclosed spaces may allow for a buildup of the vapor pressure for that material, which may enable chemical identification of the vapor inside the container if sampled and analyzed.

However, the identification of contraband material becomes increasingly difficult in an asymmetric threat scenario because of the size of the containers that may be concealing targets, the presence of interferents from the cargo or previous fumigation of the containers, and the operational constraints, which require high throughput. In addition, identification is only further complicated as a majority of contraband materials have a very low vapor pressure, which provides only trace amounts of the material in the vapor phase for identification. Any vapor that may be produced tends to adsorb onto or adhere to surfaces within the container.

In addition to the aforementioned complications associated with vapor sampling of contraband materials, vapor screening of large transport systems presents another difficulty. Thus, most systems used for vapor screening of these containers have utilized high volume sampling (HVS) systems to sample larger volumes of air and pass the sampled air to special pre-concentrator filters to capture contraband vapors for subsequent analysis and identification. There is a need for a vapor generator system suitable for use with the HVS systems and pre-concentrator filters, but there are no current commercial off-the-shelf (COTS) vapor generators that can be used at high flow rates.

Two components are useful for producing the desired threat vapor concentration at high flow rates—a reliable vapor generator and a mixing chamber. A mixing chamber is useful for reducing the vapor concentration and increasing the flow rate by introducing a clean gas source to the vapor output from the vapor generator. There is currently a need in the art for a mixing chamber suitable for vapor generation for use with high-volume sampling systems. This need and others are met by the following disclosure.

SUMMARY

Disclosed herein, in one aspect, is mixing chamber apparatus for high-volume sampling (HVS) methods. The mixing chamber apparatus can comprise an inlet manifold defining a tubing manifold port and a plurality of vapor ports, an outlet manifold defining one or more sample ports and an exhaust port, and a mixing chamber having a first end defined by the inlet manifold and a second end defined by the outlet manifold.

The apparatus can further comprise a tubing manifold extending from the tubing manifold port of the inlet manifold at least partially into the mixing chamber. The tubing manifold can comprise an elongate body having an open end, an opposing closed end, and inner and outer longitudinal surfaces. The inner longitudinal surface can define a duct extending from the open end to the closed end. The elongate body can further define a plurality of holes extending through the inner and outer longitudinal surfaces.

Also disclosed herein is a baffled mixing system. The baffled mixing system can be used together or separate from the disclosed mixing chamber apparatus. Also disclosed herein is a method for using the mixing chamber apparatus and baffled system.

In one aspect, a vapor generator mixing chamber apparatus comprises an inlet manifold defining a tubing manifold port and a plurality of vapor ports. An outlet manifold can define one or more sample ports and an exhaust port. A mixing chamber can have a first end defined by the inlet manifold, a second end defined by the outlet manifold, and one or more chamber walls extending between the inlet and outlet manifolds. A tubing manifold can extend from the tubing manifold port of the inlet manifold at least partially into the mixing chamber. The tubing manifold can comprise an elongate body having an open end, an opposing closed end, and inner and outer longitudinal surfaces, the inner longitudinal surface defining a duct extending from the open end to the closed end. The elongate body can define a plurality of holes extending through the inner and outer longitudinal surfaces into fluid communication with the duct.

In one aspect, a system comprises a clean air source, a vapor generator, and a vapor generator mixing chamber apparatus. The vapor generator mixing chamber apparatus can comprise an inlet manifold defining a tubing manifold port and a plurality of vapor ports. An outlet manifold can define one or more sample ports and an exhaust port. A mixing chamber can have a first end defined by the inlet manifold, a second end defined by the outlet manifold, and one or more chamber walls extending between the inlet and outlet manifolds. A tubing manifold can extend from the tubing manifold port of the inlet manifold at least partially into the mixing chamber. The tubing manifold can comprise an elongate body having an open end, an opposing closed end, and inner and outer longitudinal surfaces, the inner longitudinal surface defining a duct extending from the open end to the closed end. The elongate body can define a plurality of holes extending through the inner and outer longitudinal surfaces into fluid communication with the duct.

Additional advantages of the disclosed mixing chamber apparatus and method will be set forth in part in the description which follows, and in part will be understood from the description, or may be learned by practice of the disclosed apparatus and method. The advantages of the disclosed apparatus and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed mixing chamber apparatus and method and together with the description, serve to explain the principles of the disclosed chamber apparatus and method.

FIGS. 9A-B depict top and perspective views, respectively, of a gasket with a 1.5 inch diameter recess, and FIGS. 9C-D depict top and perspective views, respectively, of a gasket with a 1.375 inch diameter recess.

DETAILED DESCRIPTION

Figure 1A:
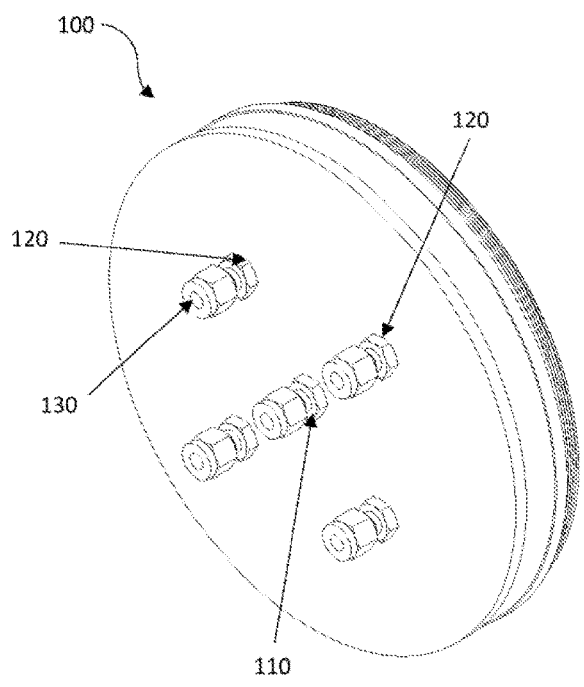
FIGS. 1A-B depict a front perspective view (FIG. 1A) and a rear perspective view (FIG. 1B) of an exemplary embodiment of an inlet manifold of a mixing chamber as disclosed herein.

The disclosed mixing chamber apparatus and method may be understood more readily by reference to the following detailed description of particular embodiments and the examples included therein and to the Figures and their previous and following description.

A. Definitions

It is to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a port" includes a plurality of such ports, and reference to "the port" is a reference to one or more ports and equivalents thereof known to those skilled in the art, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed appliance and method belong. Although any mixing chamber and method similar or equivalent to those described herein can be used in the practice or testing of the present unit and method, the particularly useful units and methods are as described.

Throughout the description and claims of this specification, the word "comprise" and variations of the word, such as "comprising" and "comprises," means "including but not limited to," and is not intended to exclude, for example, other elements, components, integers or steps. In particular, in methods stated as comprising one or more steps or operations, it is specifically contemplated that each step comprises what is listed (unless that step includes a limiting term such as "consisting of"), meaning that each step is not intended to exclude, for example, other elements, components, integers or steps that are not listed in the step.

B. Inlet and Outlet Manifolds

Disclosed herein is a mixing chamber apparatus 700 suitable for use with high-volume sampling methods, e.g., for the sampling and detection of contraband material. The mixing chamber apparatus can generally comprise four principal components: inlet and outlet manifolds, the chamber, and a tubing manifold for the introduction of clean air into the mixing chamber.

Figure 1B:
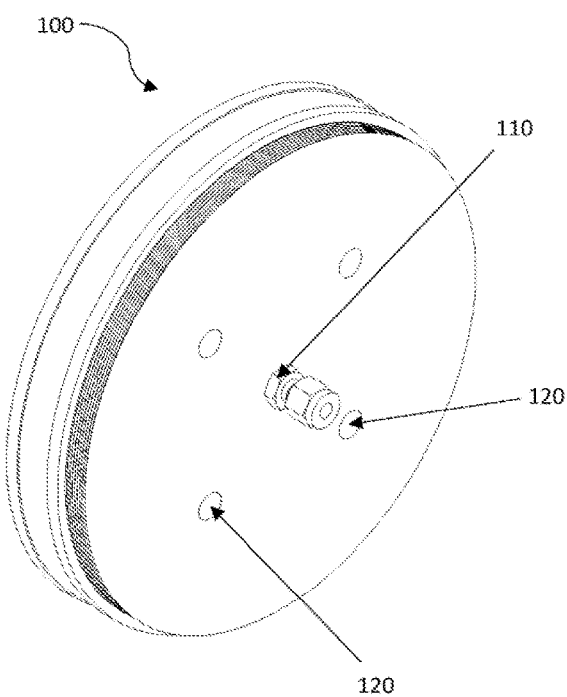

An exemplary embodiment of the inlet manifold is shown in FIGS. 1A-B. Inlet manifold 100 defines tubing manifold port 110 and a plurality of vapor ports 120. Tubing manifold port 110 can be connected to a clean air source (not shown), which can aid in the mixing of the vapor within the mixing chamber, as described below. Vapor ports 120 can be connected to a vapor source (not shown). Inlet manifold 100 is designed to accommodate mixing chambers of any material, including a flexible mixing chamber (e.g., polymer bag), a rigid mixing chamber (e.g., comprising metal, glass, or rigid polymer), or a mixing chamber that is partially flexible and/or partially rigid.

According to one aspect, inlet manifold 100 can comprise or be a cylindrical or substantially cylindrical disk. The cylindrical disk can have any suitable diameter, e.g., from about 5 inches to about 12 inches. In one embodiment, inlet manifold 100 can comprise or be a cylindrical disk having a diameter of about 8 inches. Inlet manifold 100 can include an extended threaded edge containing suitable threading (e.g., 194.31-20 thread), for the installation of a threaded metal or glass mixing chamber. Manifold port 110 and the plurality of vapor ports 120 can comprise threaded holes (e.g., ¼ national pipe thread, NPT) suitable for receiving connectors 130 (e.g., SWAGELOK connections) that can be connected to one or more vapor sources and a clean air source. In addition, inlet manifold 100 can include a groove (e.g., a circumferential or partially circumferential groove defined in at least a portion of a circumferential side edge of the inlet manifold) cut out for a clamp drive (e.g., a worm clamp drive), which can secure a plastic bag or other chamber to the manifold.

Figure 2A:
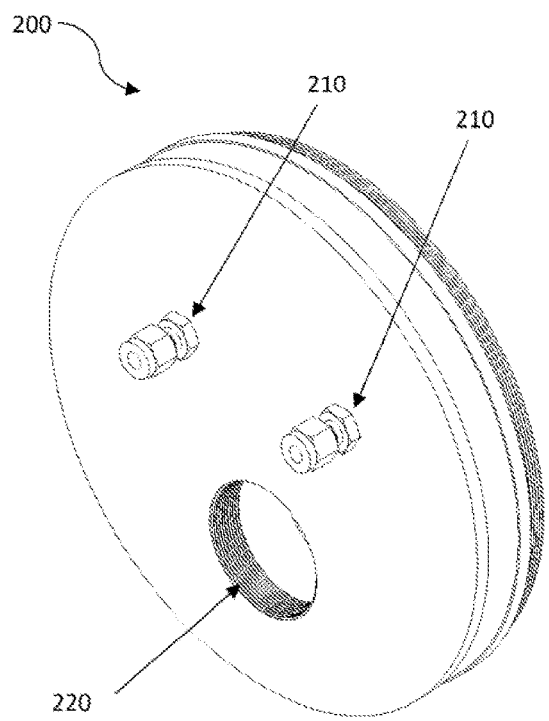
FIGS. 2A-B depict a front perspective view (FIG. 2A) and a rear perspective view (FIG. 2B) of an exemplary outlet manifold of a mixing chamber as disclosed herein.
Figure 2B:
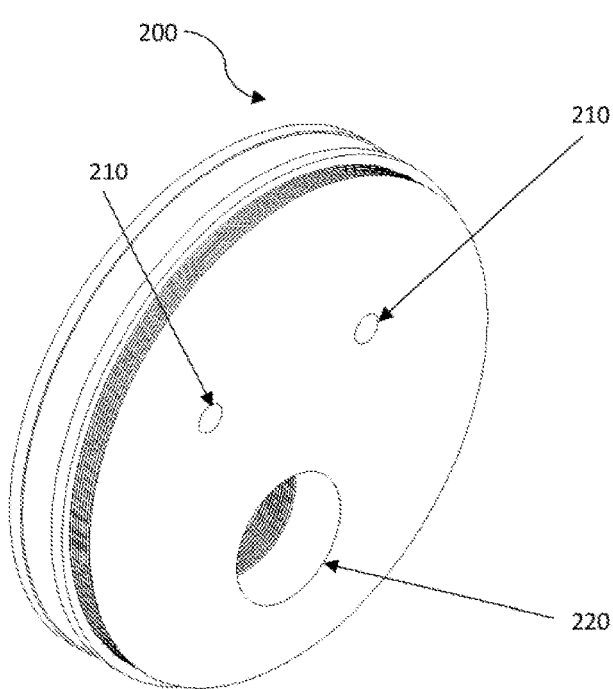

The mixing chamber apparatus can also comprise an outlet manifold, an exemplary embodiment of which is shown in FIGS. 2A-B. Outlet manifold 200 can define one or more sample ports 210 and an exhaust port 220. Samples ports 210 can comprise threaded holes (e.g., ¼ inch NPT) to allow for sampling of the vapor concentration in the mixing chamber. Sampling can be performed using conventional thermal desorption or solvent extraction sorbent tubes. Exhaust port 220 can also comprise a threaded hole (e.g., 2 inch NPT). Exhaust port 220 can serve several purposes, including to exhaust the mixing chamber of all gas and vapor, to keep the system at equilibrium, or as a connection to collect vapor onto high volume sampler (HVS) pre-concentration filter media.

The inlet and outlet manifolds can be made from a suitable material, such as a material with high mechanical strength and the capability to be passivated to minimize surface chemical reactions or the adsorption of trace molecules onto a manifold surface. An exemplary material suitable for the inlet and outlet manifolds is stainless steel (e.g., 316 stainless steel or 304L stainless steel) or aluminum or an alloy thereof (e.g., 6061 aluminum). In further aspects, the inlet and outlet manifolds can comprise or be formed from polymer (e.g., machinable polymer).

C. Mixing Chamber

Figure 3A:
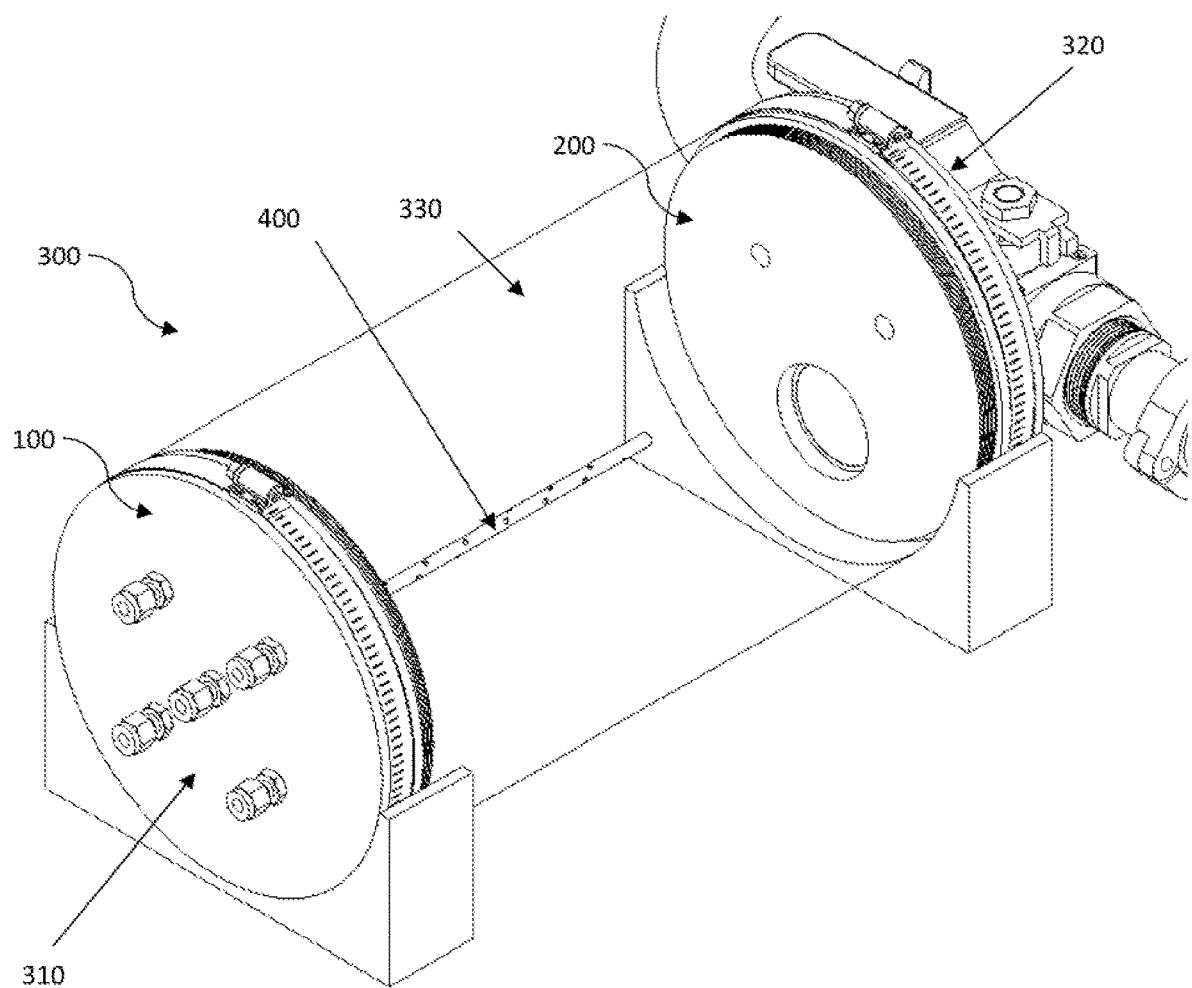
FIGS. 3A-B depict a front, inlet-end view (FIG. 3A) of a manufactured exemplary embodiment of the mixing chamber apparatus and a rear, and a rear, outlet-end view (FIG. 3B) of an exemplary mixing chamber apparatus.
Figure 3B:
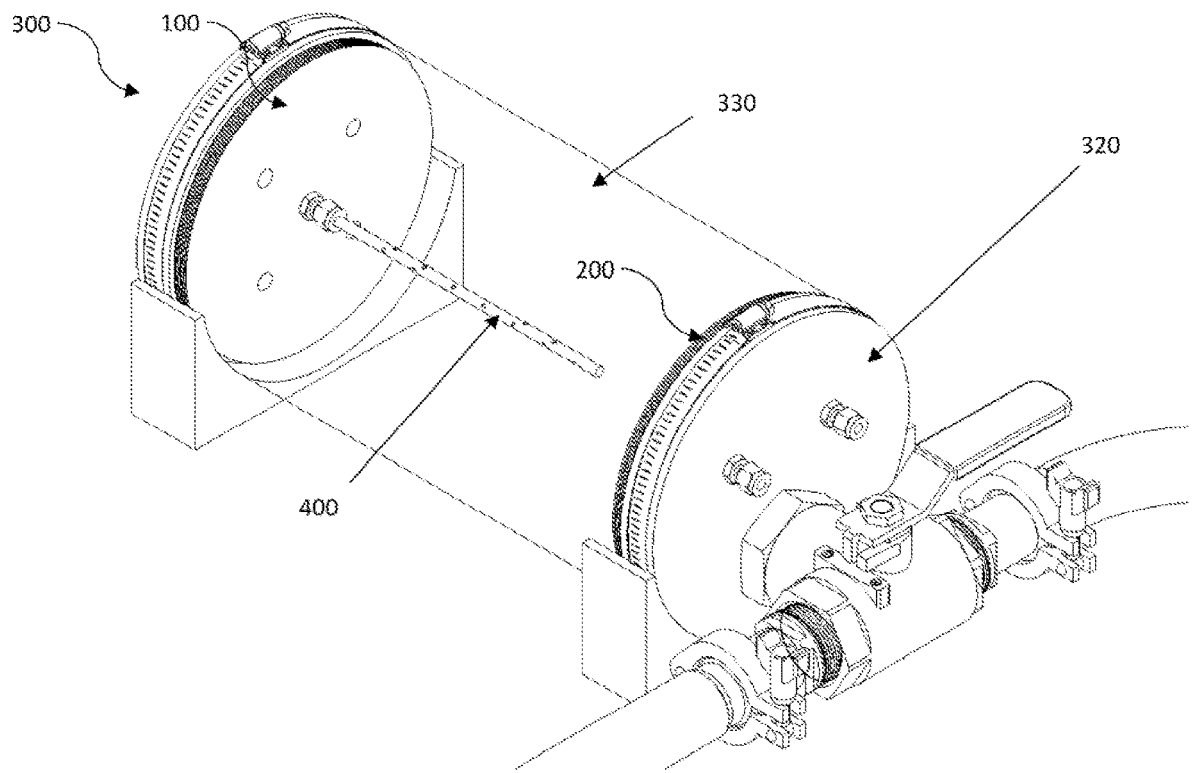

The mixing chamber of the apparatus is designed to connect to the inlet and outlet manifolds. An exemplary embodiment of the mixing chamber is shown in FIGS. 3A-B. Mixing chamber 300 has a first end 310 defined by the inlet manifold 100 and a second end 320 defined by the outlet manifold 200. The chamber 300 is further defined by chamber walls 330 extending between the inlet and outlet manifolds 100, 200.

Figure 14:
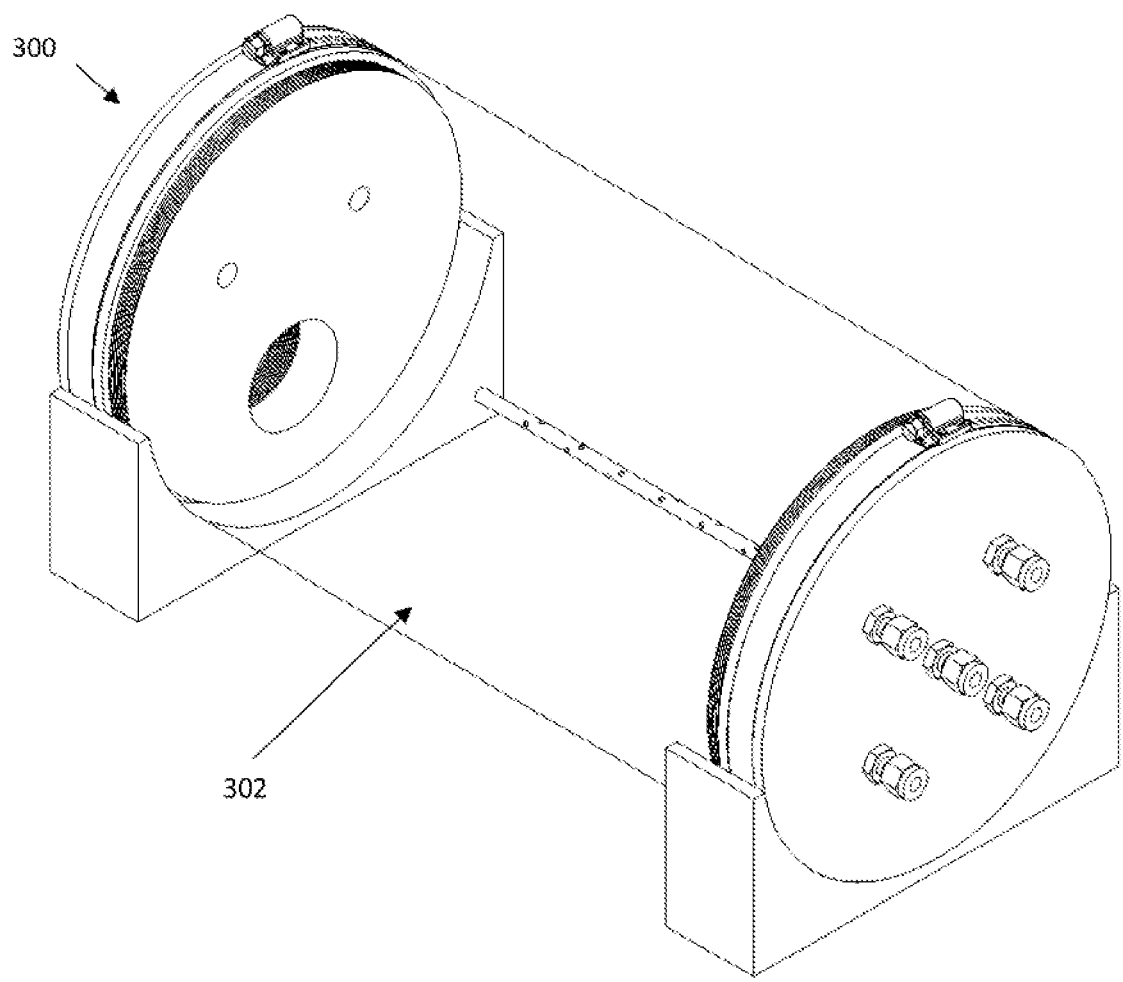
FIG. 14 depicts a perspective view of an exemplary mixing chamber comprising a polymer bag.
Figure 15:
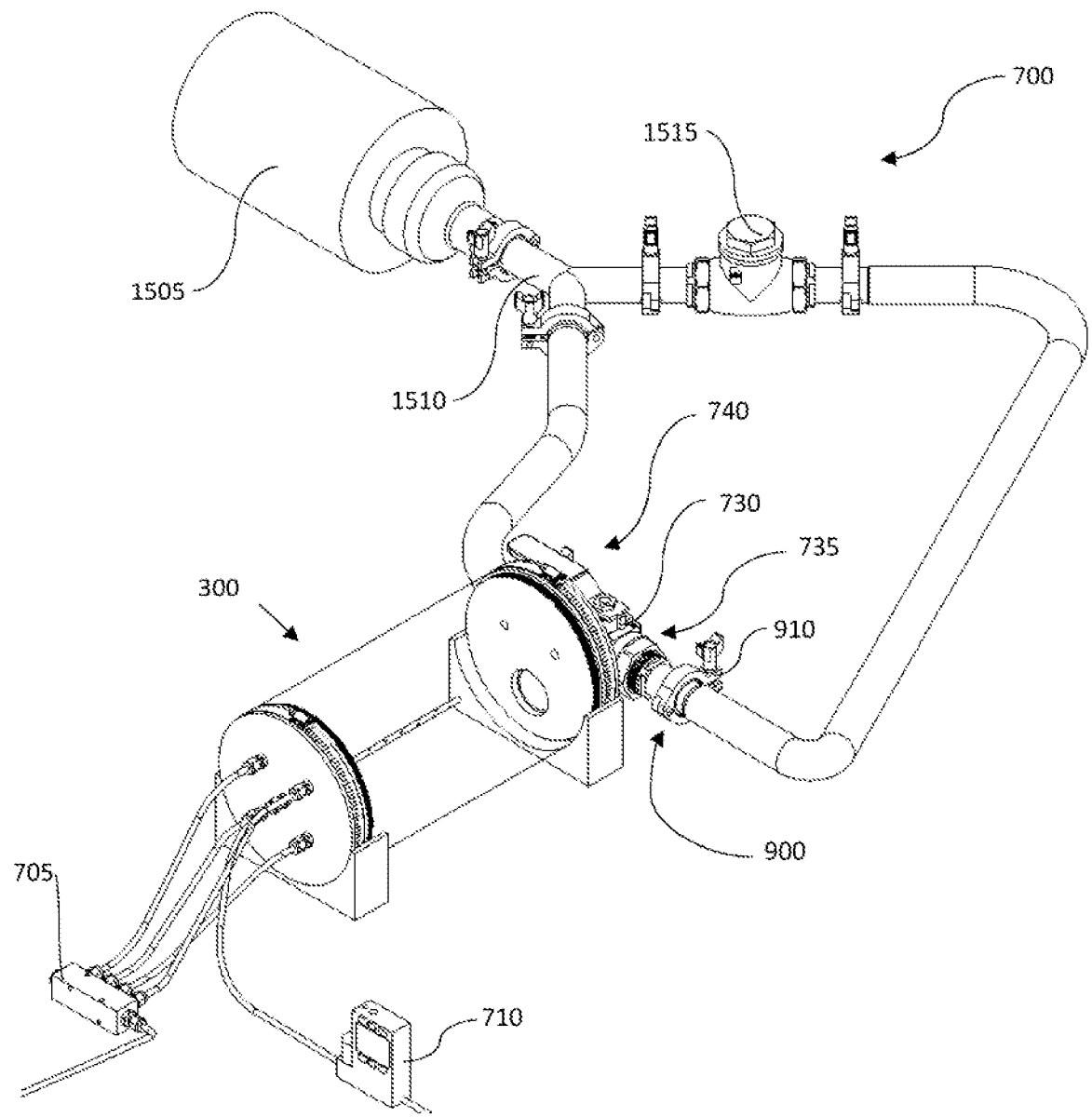
FIG. 15 depicts a partial perspective view of a system as disclosed herein.

According to one optional aspect, mixing chamber 300 can utilize a disposable bag 302 (FIG. 14) designed for cleanroom packaging (e.g., a disposable bag manufactured by Cleanroom Film & Bags). Optionally, the disposable bag can be a film bag that has low ionic contamination. For example, the disposable bag can comprise Ultra-Low Outgassing (ULO) Poly Film line, available from Cleanroom Film & Bags. The disposable bag can be useful because of its expendability and low-chemical profile, which can be important when performing vapor trace sampling. By using a low-cost bag as the chamber, contamination can be minimized by disposing the chamber bag when desired (e.g., after each set of experiments, changing threat materials and/or vapor concentrations). Furthermore, the disposable bag allows for the overall design to be prototyped and tested prior to manufacturing a large, metal or glass chamber (if desired). While a disposable bag is one illustrated embodiment, in other embodiments, as shown in FIGS. 3A-3B, mixing chamber 300 can be defined by chamber walls 330 comprising polymer (e.g., machinable polymer, for example machinable plastic), metal or glass, or combinations thereof.

D. Tubing Manifold

Figure 4:
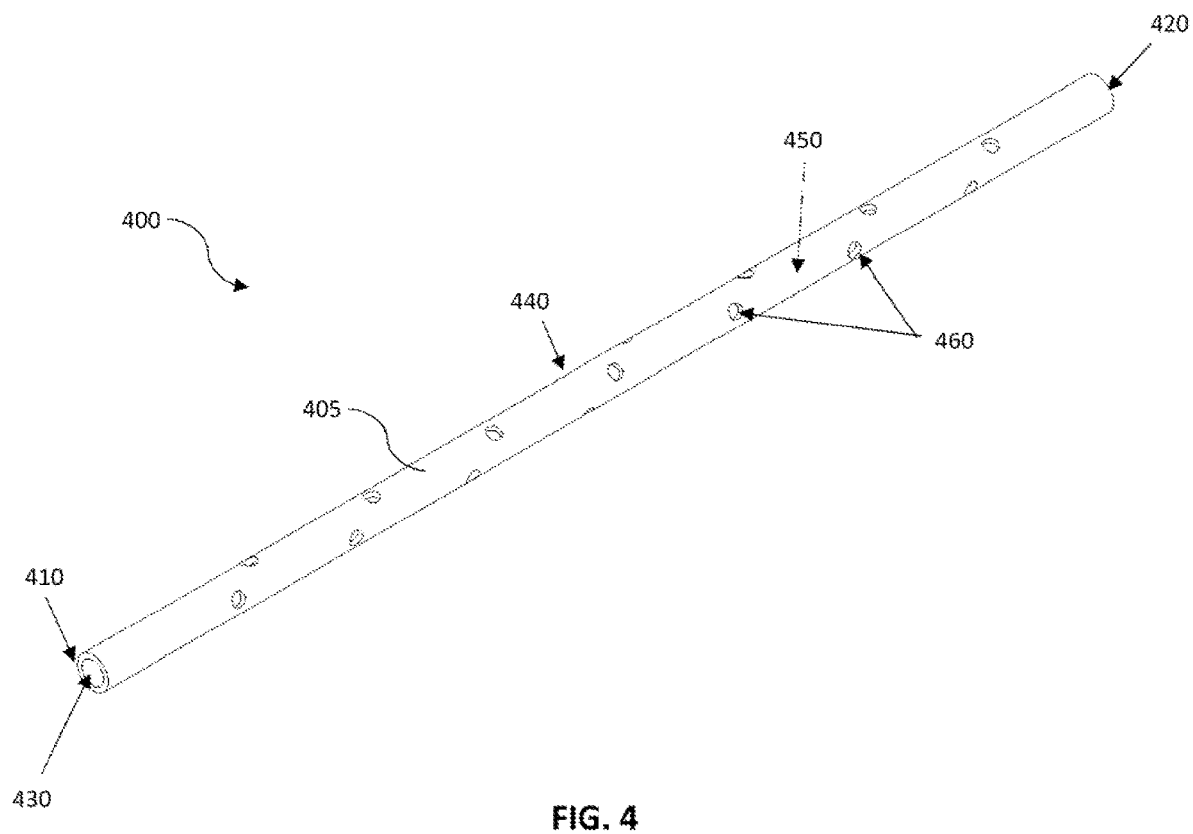
FIG. 4 depicts an exemplary design of a tubing manifold with similarly sized holes designed to extend from the inlet manifold at least partially into the mixing chamber.

According to one aspect, and as shown in FIG. 3B, a tubing manifold extends from the tubing manifold port of the inlet manifold at least partially into the mixing chamber. An exemplary tubing manifold is shown in FIG. 4. Tubing manifold 400 comprises an elongate body 405 having an open end 410, an opposed closed end 420, and inner (430) and outer (440) longitudinal surfaces. Inner longitudinal surface 430 defines duct 450 which extends from open end 410 to closed end 420. The elongate body further defines a plurality of holes 460 extending through the inner (430) and outer (440) longitudinal surfaces.

Closed end 420 can be closed to force clean air through the plurality of holes 460. According to one aspect, the opposing open end 410 can connect to a central connector (e.g., central SWAGELOK connection) in the inlet manifold 100, which can be connected to a clean air source. The plurality of holes 460 permit clean air to travel through tubing manifold 400 and exhaust through the plurality of holes 460, which creates a turbulent flow for mixing the sample vapor from the vapor source. In one aspect, the plurality of holes 460 can be arranged in a helical or substantially helical pattern. Such a pattern can allow for a more even airflow distribution than other patterns. Said even airflow distribution can generate a more turbulent flow to mix the sample vapor with the clean air. However, other hole patterns are contemplated. Tubing manifold 400 can be made from a suitable high-strength material, such as stainless steel (e.g., 316 stainless steel). Dimensions of tubing manifold 400 can vary depending on the application. In one aspect, the tubing manifold has a diameter from about ⅛ inch to about 1 inch (e.g., about ¼ inch). In further aspects, the diameter of the tubing manifold can be proportional to the diameter of the chamber.

Figure 5:
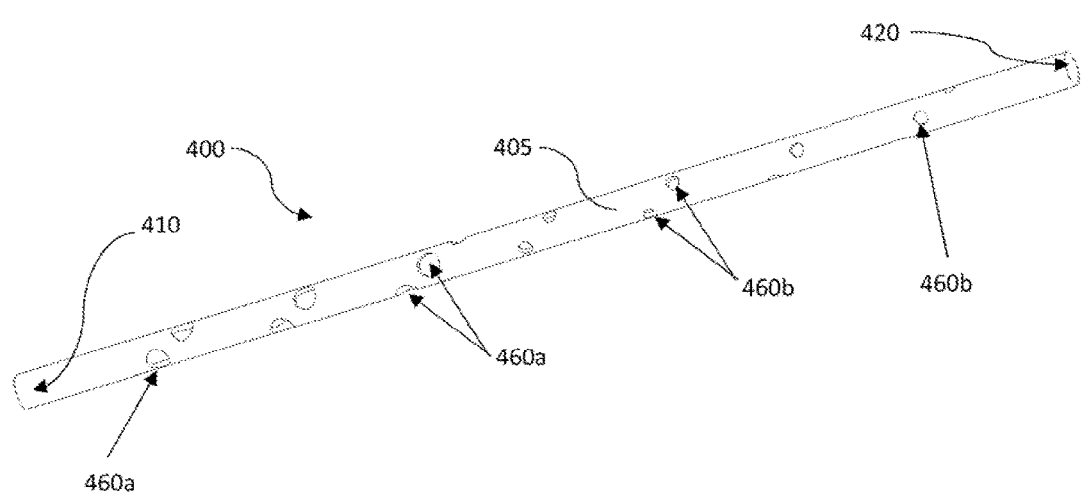
FIG. 5 depicts an alternative exemplary embodiment of the tubing manifold with differently sized holes.

A variety of alternative embodiments for the tubing manifold are contemplated. In one aspect, with reference to FIG. 5, the holes 460 of the elongate body of the tubing manifold can comprise a plurality of larger holes 460a near the front (inlet) portion of the tubing manifold and a plurality of smaller holes 460b near the opposing closed end of the tubing manifold. In exemplary aspects, it is contemplated that the diameter of the holes 460 can gradually decrease moving from the inlet portion of the tubing manifold toward the closed end of the tubing manifold. For example, it is contemplated that the largest holes can be positioned proximate the front (inlet) portion and the smallest holes can be positioned proximate the closed end portion, with holes between the largest and smallest holes having respective diameters that are less than the diameters of the largest holes but greater than the diameters of the smallest holes. The larger holes near the front of the manifold allow clean air to flow out more easily, thus creating a suitable distribution of the air flow. In exemplary aspects, the holes 460 can have diameters from about 0.1 inches to about 0.375 inches (e.g., optionally, about 0.25 inches). It is contemplated that the diameters of the holes can be proportional to the diameter and/or length of the tubing manifold 400. In various optional aspects, the diameter of the larger holes 460$a$ can be about twice the diameter of the smaller holes 460$b$.

Figure 6:
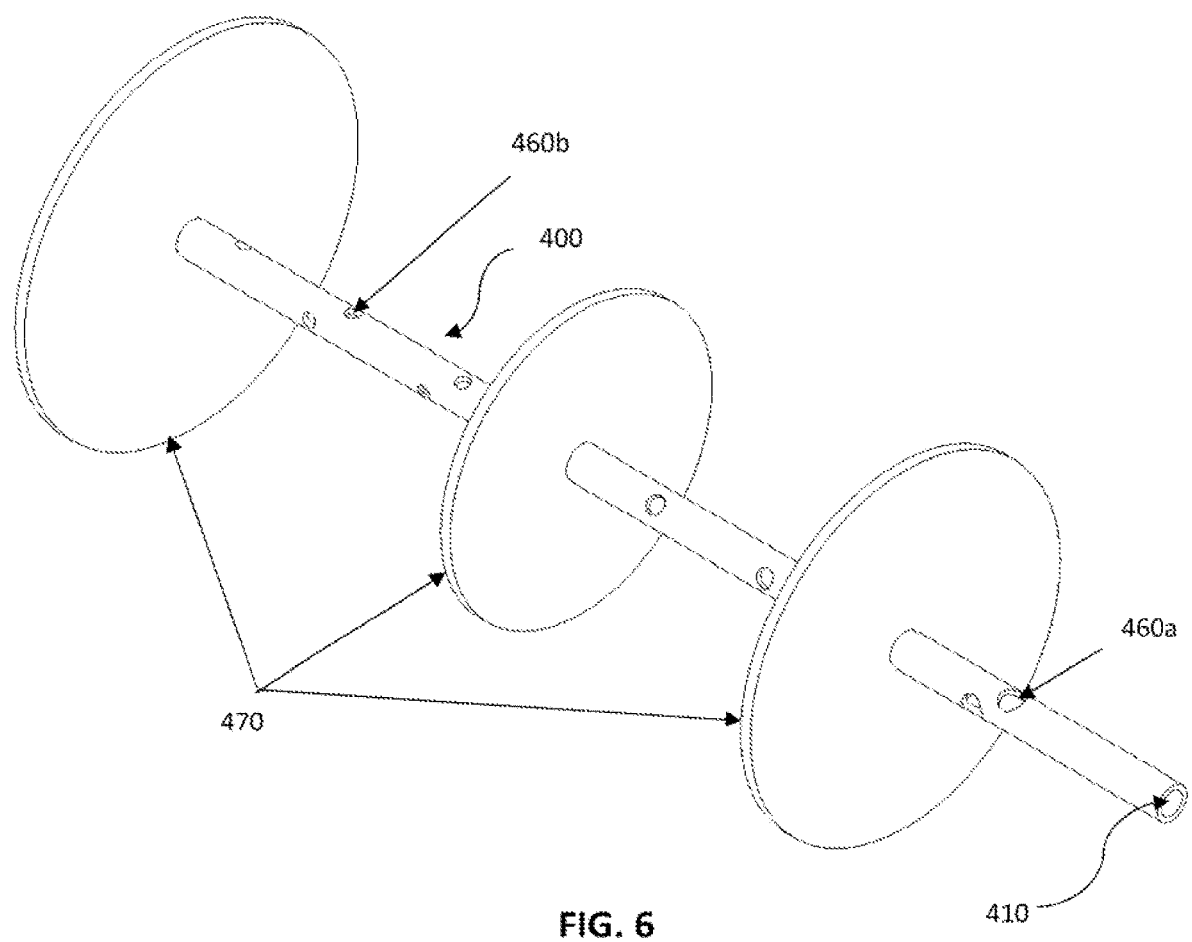
FIG. 6 depicts an alternative exemplary embodiment of the tubing manifold with baffles spaced along the elongate body of the manifold.

According to another aspect, with reference to FIG. 6, the tubing manifold can comprise one or more baffles 470 (e.g., circular baffles) positioned around the elongate body. The baffles can be strategically placed at locations along the length of the manifold. The baffles 470 can extend radially outwardly from the body of the manifold. Optionally, the tubing manifold can have a central axis, and the central axis can extend through the center of the baffles 470. The addition of the baffles 470 can create more turbulence inside of the mixing chamber, and therefore can create more mixing between the sample (e.g., contraband) vapor and the clean air exiting the plurality of holes of the tubing manifold. It is contemplated that the baffles can comprise outer baffles (with at least one outer baffle positioned near each respective end of the manifold), and one or more middle (or intermediate) baffles positioned between the outer baffles along the central axis of the manifold. The middle (intermediate) baffles can have a smaller radial dimension (e.g., diameter) to promote mixing toward a center of the mixing chamber along a central axis of the mixing chamber.

E. Mixing Chamber Apparatus, Method of Use, and System Comprising Apparatus

Figure 7:
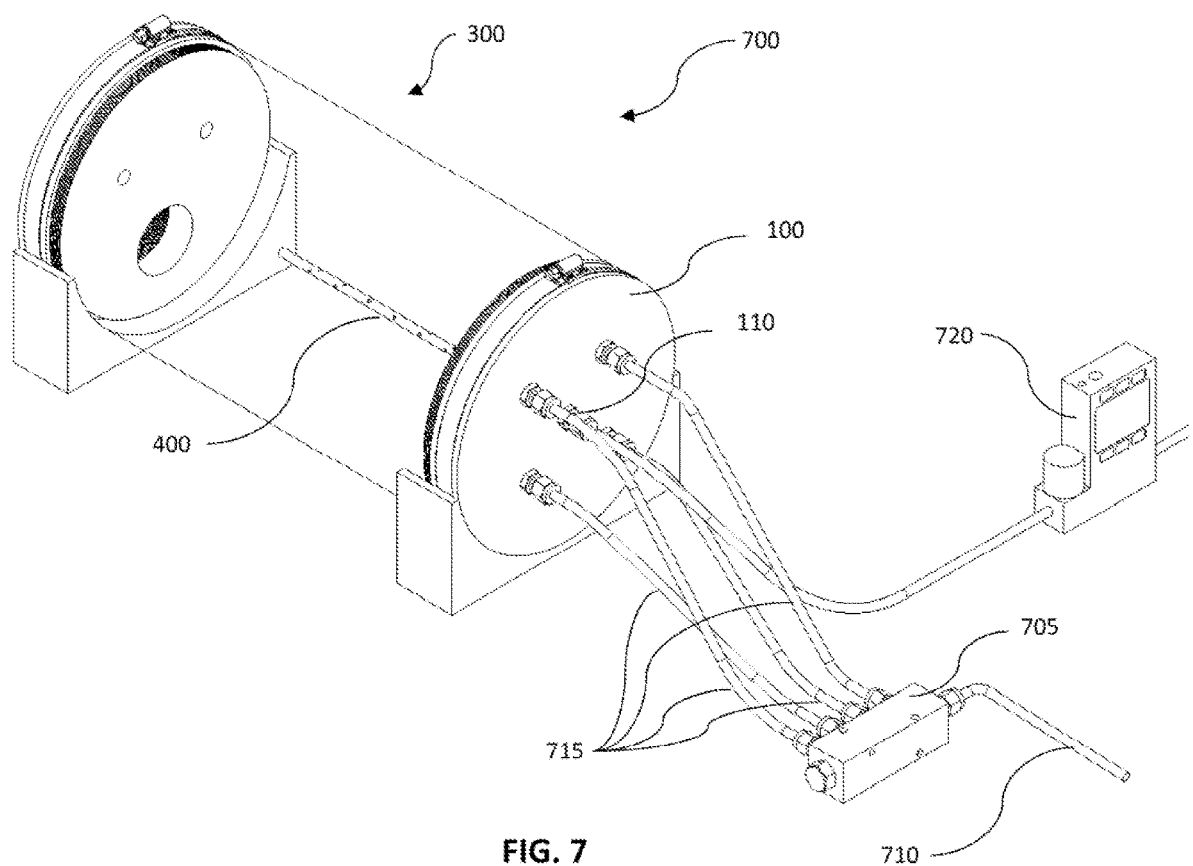
FIG. 7 depicts a frontal view of an exemplary embodiment of the mixing chamber apparatus.
Figure 8:
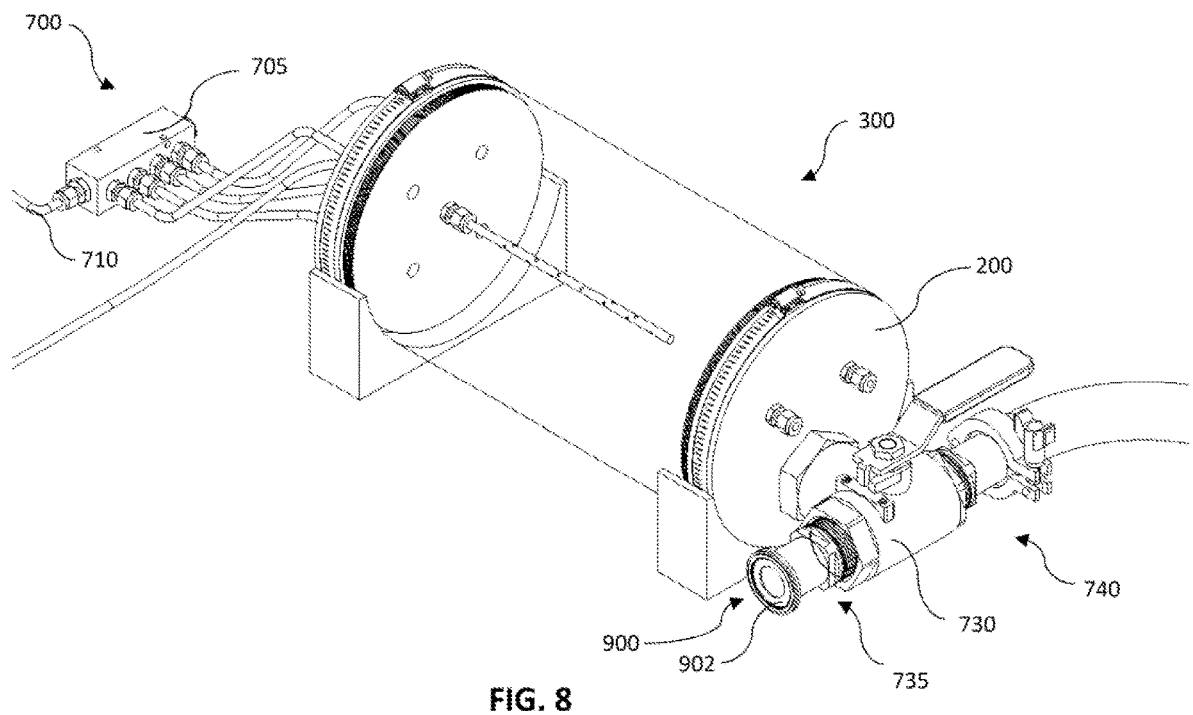
FIG. 8 depicts a rear view of an exemplary embodiment of the mixing chamber apparatus.
Figure 9A:
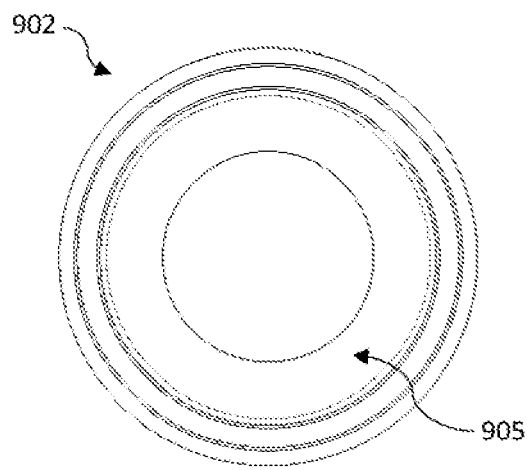
FIGS. 9A-D depict exemplary embodiments of gaskets for different filter media.
Figure 9B:
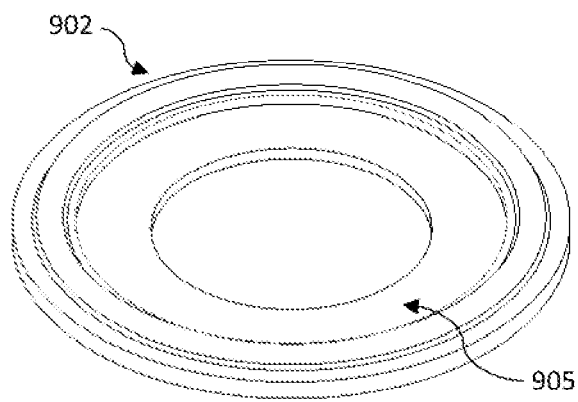
Figure 9C:
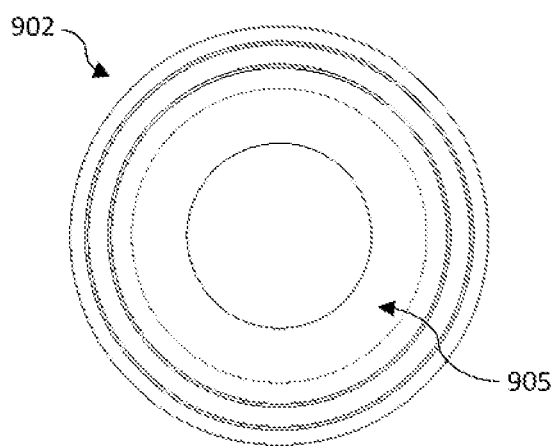
Figure 9D:
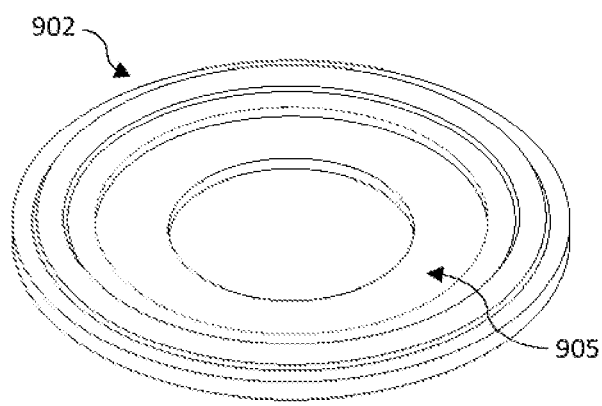
Figure 10:
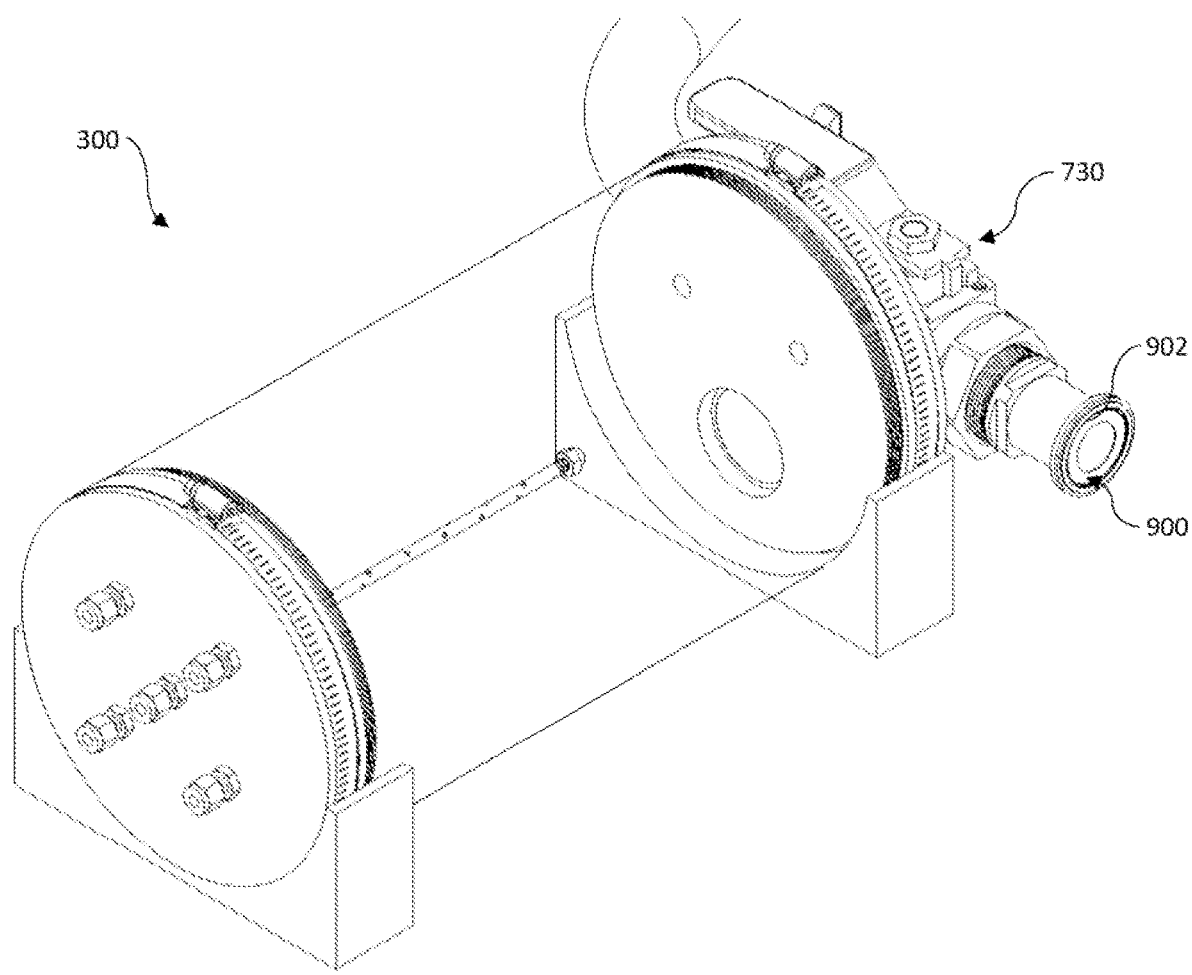
FIG. 10 depicts a gasket with a modified filter inserted into the mixing chamber assembly.

An exemplary embodiment of the mixing chamber apparatus 700 is shown in FIGS. 7-8. A vapor generator output and a clean air compressor can be connected to a wye connector, which flows into a manifold 705 (optionally, a commercial off-the-shelf (COTS) aluminum manifold) via tubing 710 (optionally, ¼ inch polytetrafluoroethylene (PTFE) tubing). The vapor can then be split by the manifold into a plurality of gas lines (optionally, four separate gas lines) 715, which are connected to corresponding vapor ports 120 (e.g., four SWAGELOK vapor ports) on the inlet manifold 100 by tubing (e.g., ¼ inch PTFE tubing). Optionally, the tubing can be steel (e.g., stainless steel) tubing that is wrapped in heating tape, which can allow for the tubing to be heated in order to remove adsorbed compounds from the tubing walls.

With reference to FIG. 7, an air compressor (not shown) can be connected to the central manifold port 110 on the inlet manifold 100 with a high volume mass flow controller 720 between the air compressor and the mixing chamber to control the flow rate of the air being introduced to the mixing chamber. From the mass flow controller 720, the air can flow through the various holes (optionally, the helically patterned or otherwise patterned holes) of the tubing manifold 400, creating turbulent air flow and mixing with the vapor from the generator flowing into the mixing chamber from the vapor ports on the inlet manifold 100.

Referring to FIG. 8, a three-way valve 730 can be connected to the exhaust port 220 (e.g., 2 inch NPT hole) on the outlet manifold 200 to allow the user to control the flow direction. By adjusting the three-way valve 730, the user can either have the flow path go to the HVS filter media on a sampling side 735 of the three-way valve 730 when sampling or change the flow direction to exhaust from an exhaust side 740 of the three-way valve when not sampling. This allows the vapor generator and mixing system to remain in operation to season the system, allows the vapor concentration to reach a steady-state, and allows for filters to be switched between analyses.

The exhaust side 740 of the three-way valve 730 can be connected to a hose (e.g., 1.5 inch hosing) which runs to a high volume carbon scrubber 1505 (optionally, through a wye connector 1510). The carbon scrubber 1505 can prevent contamination of the surrounding area. With reference to FIGS. 8-10 and 15, the filter and sampling side 735 of the three-way valve 730 can be connected to an adapter Thus, 900 in which one or more gaskets 902 (e.g., TEFLON gaskets) can be positioned to hold the various filters. In various aspects, the adapter 900 can comprise the gasket 902 and a receptacle (e.g., groove) that is configured to receive the gasket. In exemplary aspects, a plurality of gaskets 902 can be provided, and the gaskets can be interchanged or substituted for one another based on the size of the filter. A hose can be placed on the other end of the adapter 900, optionally retained with a hose clamp 910, keeping the gasket 902 with filter in place while sampling and communicating the exhaust vapor into the other side of the wye connector 1510 and then through the carbon scrubber 1505. A check valve 1515 can be positioned before the sampling side of the wye connector 1510 to prevent any backflow coming from the exhaust side 740 of the three-way valve 730. The gasket 900 can define a recess 905 having a depth and an outer perimeter that is configured to receive a filter media of a given thickness and dimension. For example, the filter media can be a circular disc. Accordingly, the recess 905 can have a diameter that is sufficient to receive the filter media.

As an alternative to, or in addition to the mixing chamber, a baffled system 1100 can be used to ensure proper mixing of the sample (e.g., explosive) vapor with the high flow rate clean air. The baffled system can be used as a standalone feature without the mixing chamber or can be added to the existing mixing chamber apparatus using conventional connectors or other COTS parts.

Figure 11:
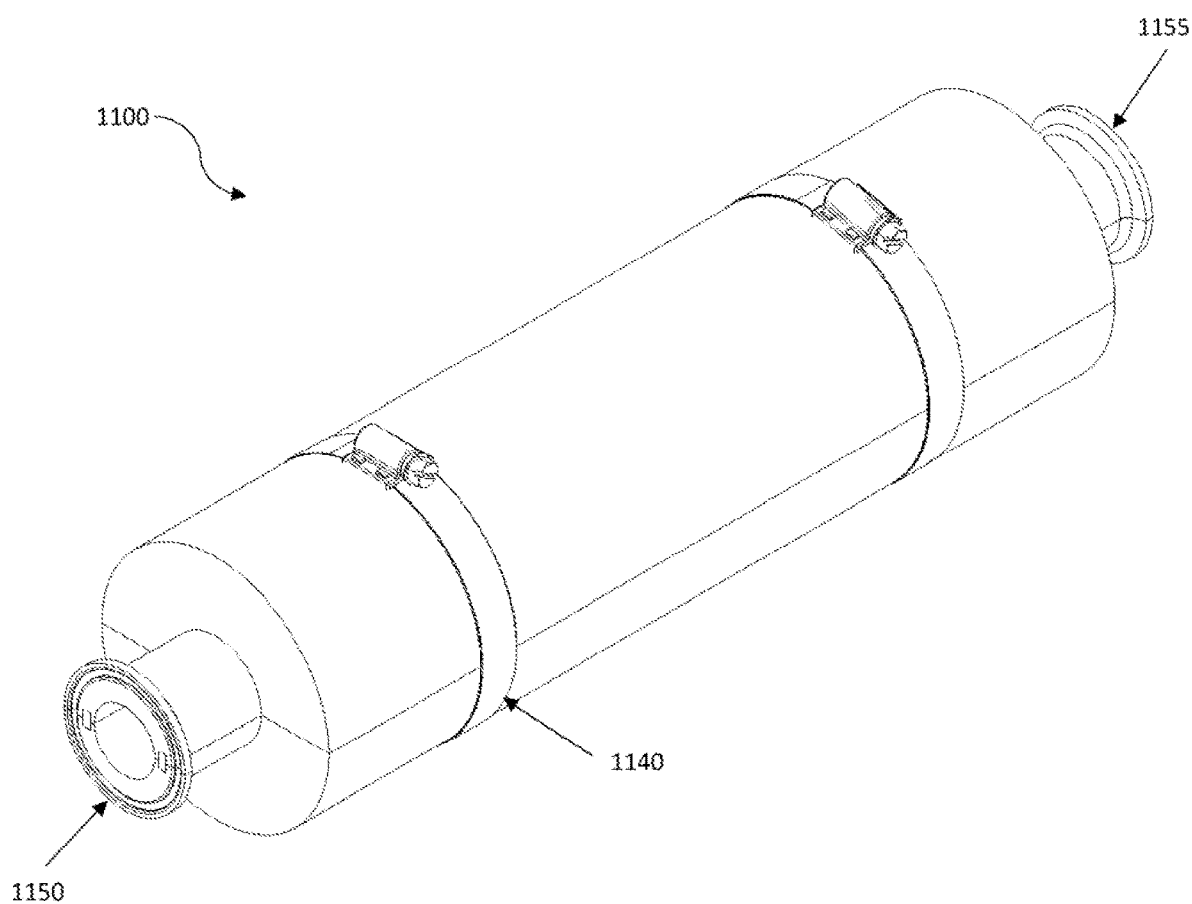
FIG. 11 depicts an alternative baffled mixing system.
Figure 12:
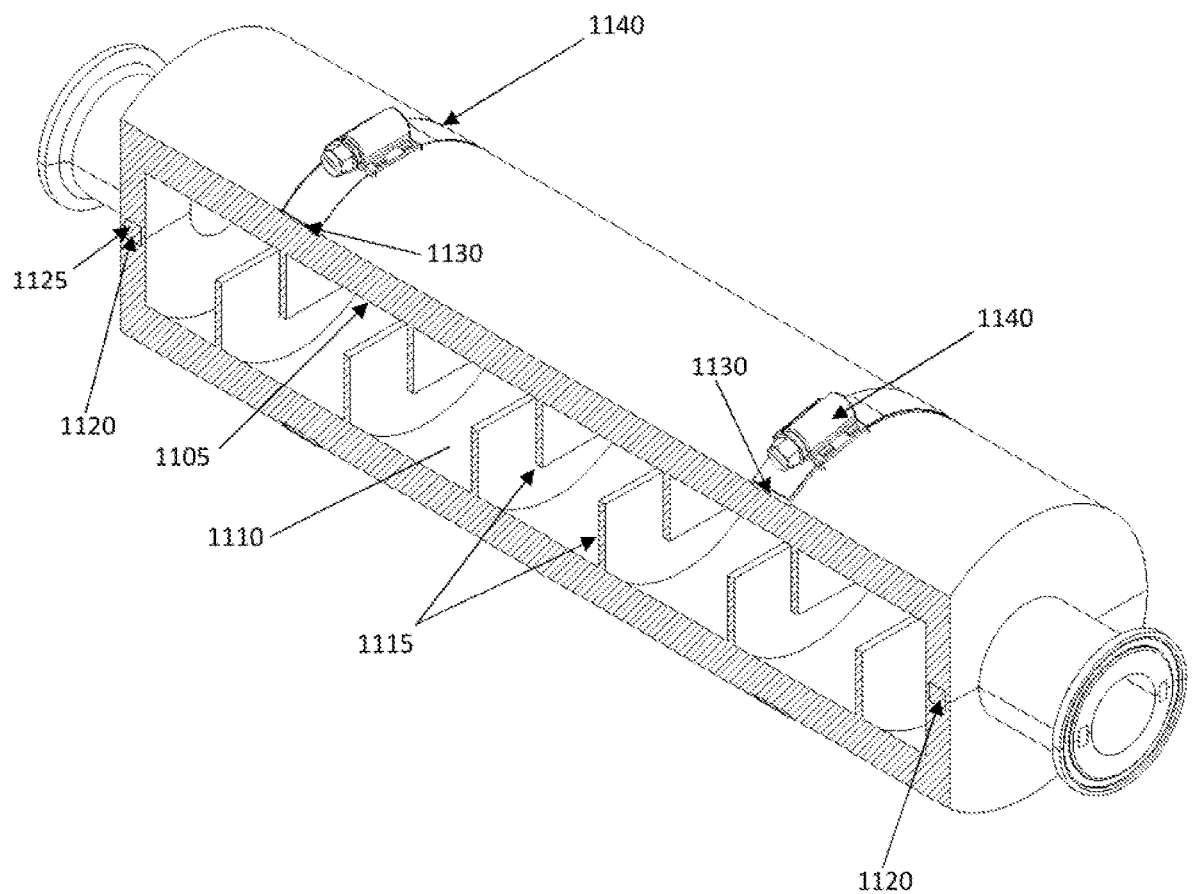
FIG. 12 depicts a sectional perspective view of the alternative baffled mixing system of FIG. 11.

With reference to FIGS. 11-12, the baffled system can comprise three main parts: a top body portion 1105, a bottom body portion 1110, and one or a pair of gaskets 1120. The top and bottom body portions can comprise spaced (optionally, evenly spaced) baffle elements 1115 that force air into a turbulent flow state, which in turn creates proper mixing inside the assembly. In exemplary aspects, and as shown in FIG. 12, it is contemplated that the baffle elements 1115 of the top body portion 1105 can be staggered (longitudinally) from the baffle elements 1115 of the bottom body portion 1110, with the baffle elements of the top body portion extending downwardly toward the bottom body portion and the baffle elements of the bottom body portion extending upwardly toward the top body portion. In exemplary aspects, the baffle elements 1115 of the top body portion 1105 can partially (e.g., vertically) overlap the baffle elements of the bottom body portion 1110 such that a central longitudinal axis of the baffled system 1100 intersects baffle elements 1115 of both the top body portion 1105 and the bottom body portion 1110. In further aspects, the baffle elements 1115 of the top and bottom portions 1105, 1110 can extend to, or shy of, the central longitudinal axis of the baffled system 1100.

Figure 13:
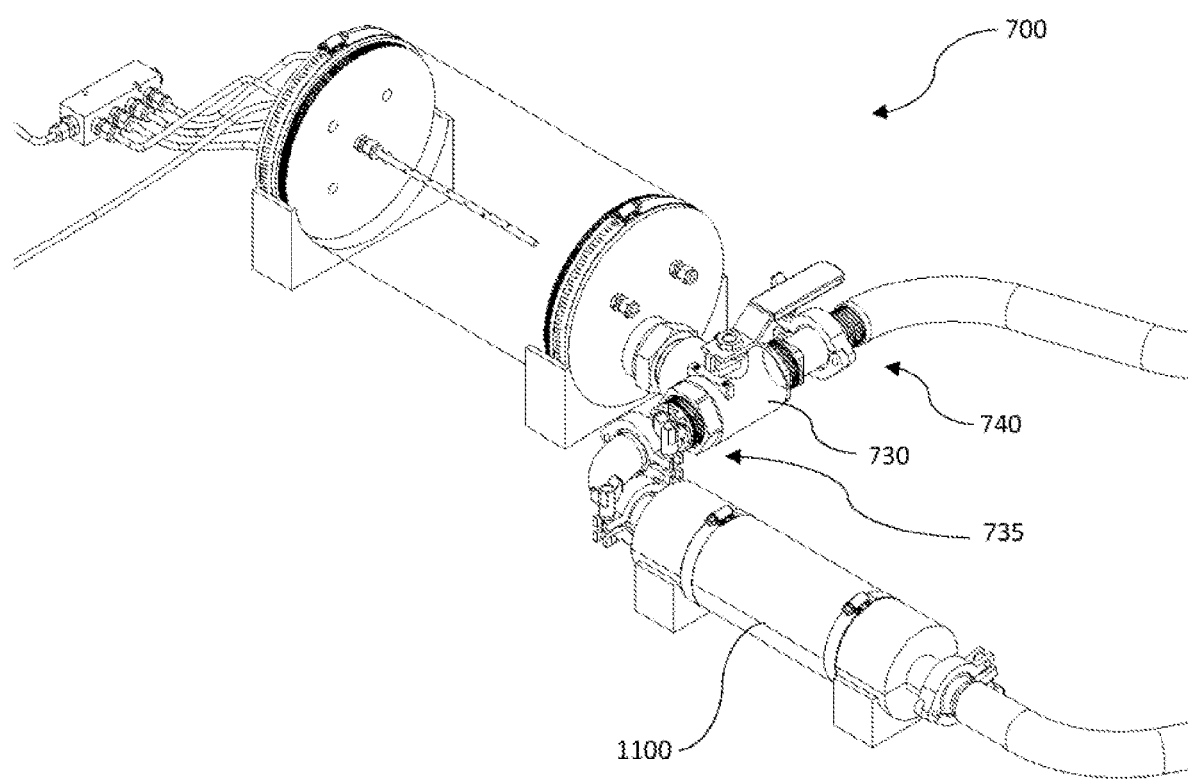
FIG. 13 depicts a rear view of a design of the mixing chamber apparatus featuring a baffled system in fluid communication with the exhaust port of the outlet manifold.

The top and bottom baffled portions can define two recessed cutouts 1125 on the interior and two recessed cutouts 1130 on the exterior. The interior cutouts 1125 can be configured to receive the gasket 1120 to be placed in between the top and bottom body portions (e.g., at the opposing ends of the assembly). The outside cut outs 1130 can be configured to receive a clamp 1140 (e.g., COTS worm-drive clamps) to be placed around the top and bottom body portions 1105, 1110, and the clamp 1140 can be tightened in order to securely hold the two body portions together. The two body portions can work together in tandem to create an airtight seal on the baffled system. As shown in FIG. 11, the baffled system 1100 can define an inlet 1150 and an outlet 1155 that is configured to be in communication with one or more filters. A gasket (e.g., a custom TEFLON gasket) can hold the filter media which can be placed on the outlet port, and the gasket then can connect to an exhaust hose. FIG. 13 shows a mixing chamber apparatus with both a mixing chamber and the baffled system.

Those skilled in the art will recognize, or be able to ascertain using no more than routine experimentation, many equivalents to the specific embodiments of the systems and methods described herein. Such equivalents are intended to be encompassed by the following claims.

What is claimed is:

1. A vapor generator mixing chamber apparatus comprising:
  a. an inlet manifold defining a tubing manifold port and a plurality of vapor ports;
  b. an outlet manifold defining one or more sample ports and an exhaust port;
  c. a mixing chamber having a first end defined by the inlet manifold, a second end defined by the outlet manifold, and one or more chamber walls extending between the inlet and outlet manifolds;
  d. a tubing manifold extending from the tubing manifold port of the inlet manifold at least partially into the mixing chamber,
    the tubing manifold comprising an elongate body having an open end, an opposing closed end, and inner and outer longitudinal surfaces, the inner longitudinal surface defining a duct extending from the open end to the closed end, wherein the elongate body defines a plurality of holes extending through the inner and outer longitudinal surfaces into fluid communication with the duct;
    wherein the tubing manifold further comprises one or more baffles positioned around the elongate body, wherein each baffle of the one or more baffles defines a central opening that receives a portion of the elongate body.

2. The apparatus of claim 1, wherein the plurality of holes defined by the elongate body of the tubing manifold are arranged in a helical pattern.

3. The apparatus of claim 1, wherein the one or more baffles comprises a plurality of baffles.

4. The apparatus of claim 1, further comprising a three-way valve, wherein the exhaust port of the outlet manifold connects to the three-way valve.

5. The apparatus of claim 1, further comprising a baffled mixing system, wherein the exhaust port of the outlet manifold is in fluid communication with the baffled mixing system.

6. The apparatus of claim 5, wherein the baffled mixing system comprises:
  a. a top body portion that defines a first plurality of baffle elements;
  b. a bottom body portion that defines a second plurality of baffle elements, wherein the top body portion and the bottom body portion cooperate to define an interior of the baffled mixing system and a port in fluid communication with the interior, wherein the baffle elements of the second plurality of baffle elements are offset from the baffle elements of the first plurality of baffle elements within the interior of the baffled mixing system, wherein the first plurality of baffle elements extend toward the bottom body portion, and wherein the second plurality of baffle elements extend toward the top body portion; and
  c. a gasket coupled to the port.

7. The apparatus of claim 1, wherein a first hole of the plurality of holes defined by the elongate body has a first diameter, wherein a second hole of the plurality of holes defined by the elongate body has a second diameter that is less than the first diameter, and wherein the first hole is positioned between the open end of the elongate body and the second hole.

8. The apparatus of claim 1, wherein each hole of the plurality of holes defined by the elongate body has a respective diameter, wherein the plurality of holes comprises a first plurality of holes having a first diameter and a second plurality of holes having a second diameter that is less than the first diameter, wherein the first plurality of holes are positioned between the open end of the elongate body and the second plurality of holes.

9. The apparatus of claim 1, wherein the inlet manifold comprises a threaded outer edge.

10. The apparatus of claim 9, wherein the mixing chamber defines threading that is configured for complementary engagement with the threaded outer edge of the inlet manifold.

11. The apparatus of claim 10, wherein the mixing chamber comprises metal.

12. The apparatus of claim 1, wherein the inlet manifold defines a groove.

13. The apparatus of claim 12, further comprising a clamp that is configured for receipt within the groove of the inlet manifold.

14. The apparatus of claim 13, wherein the mixing chamber comprises a bag.

15. The apparatus of claim 14, wherein the bag comprises plastic.

16. A system comprising:
  a. a clean air source;
  b. a vapor generator;
  c. a vapor generator mixing chamber apparatus comprising:
    i. an inlet manifold defining a tubing manifold port in fluid communication with the clean air source and a plurality of vapor ports in fluid communication with the vapor generator;
    ii. an outlet manifold defining one or more sample ports and an exhaust port;
    iii. a mixing chamber having a first end defined by the inlet manifold, a second end defined by the outlet manifold, and one or more chamber walls extending between the inlet and outlet manifolds;
    iv. a tubing manifold extending from the tubing manifold port of the inlet manifold at least partially into the mixing chamber,
      the tubing manifold comprising an elongate body having an open end, an opposing closed end, and inner and outer longitudinal surfaces, the inner longitudinal surface defining a duct extending from the open end to the closed end, wherein the elongate body defines a plurality of holes extending through the inner and outer longitudinal surfaces into fluid communication with the duct.

17. A method comprising:
a. mixing clean air and vapor within a mixing chamber apparatus, the mixing chamber apparatus comprising:
i. an inlet manifold defining a tubing manifold port in fluid communication with a clean air source and a plurality of vapor ports in fluid communication with a vapor generator;
ii. an outlet manifold defining one or more sample ports and an exhaust port;
iii. a mixing chamber having a first end defined by the inlet manifold, a second end defined by the outlet manifold, and one or more chamber walls extending between the inlet and outlet manifolds;
iv. a tubing manifold extending from the tubing manifold port of the inlet manifold at least partially into the mixing chamber,
the tubing manifold comprising an elongate body having an open end, an opposing closed end, and inner and outer longitudinal surfaces, the inner longitudinal surface defining a duct extending from the open end to the closed end, wherein the elongate body defines a plurality of holes extending through the inner and outer longitudinal surfaces into fluid communication with the duct,
wherein the clean air flows from the clean air source to the tubing manifold port, and
wherein the vapor flows from the vapor generator to the plurality of vapor ports.

18. The method of claim 17, wherein the vapor generator produces the vapor based on a material sample.

19. The method of claim 18, wherein the material sample comprises explosive material.

20. A vapor generator mixing chamber apparatus comprising:
a. an inlet manifold defining a tubing manifold port and a plurality of vapor ports;
b. an outlet manifold defining one or more sample ports and an exhaust port;
c. a three-way valve, wherein the exhaust port of the outlet manifold connects to the three-way valve;
d. a mixing chamber having a first end defined by the inlet manifold, a second end defined by the outlet manifold, and one or more chamber walls extending between the inlet and outlet manifolds;
e. a tubing manifold extending from the tubing manifold port of the inlet manifold at least partially into the mixing chamber,
the tubing manifold comprising an elongate body having an open end, an opposing closed end, and inner and outer longitudinal surfaces, the inner longitudinal surface defining a duct extending from the open end to the closed end, wherein the elongate body defines a plurality of holes extending through the inner and outer longitudinal surfaces into fluid communication with the duct.

21. A vapor generator mixing chamber apparatus comprising:
a. an inlet manifold defining a tubing manifold port and a plurality of vapor ports;
b. an outlet manifold defining one or more sample ports and an exhaust port;
c. a baffled mixing system, wherein the exhaust port of the outlet manifold is in fluid communication with the baffled mixing system
d. a mixing chamber having a first end defined by the inlet manifold, a second end defined by the outlet manifold, and one or more chamber walls extending between the inlet and outlet manifolds;
e. a tubing manifold extending from the tubing manifold port of the inlet manifold at least partially into the mixing chamber,
the tubing manifold comprising an elongate body having an open end, an opposing closed end, and inner and outer longitudinal surfaces, the inner longitudinal surface defining a duct extending from the open end to the closed end, wherein the elongate body defines a plurality of holes extending through the inner and outer longitudinal surfaces into fluid communication with the duct.

\* \* \* \* \*